US010592451B2

United States Patent
Driever et al.

(10) Patent No.: US 10,592,451 B2
(45) Date of Patent: Mar. 17, 2020

(54) MEMORY ACCESS OPTIMIZATION FOR AN I/O ADAPTER IN A PROCESSOR COMPLEX

(71) Applicant: International Business Machines Corporation, Armonk, NY (US)

(72) Inventors: Patricia G. Driever, Poughkeepsie, NY (US); Jerry W. Stevens, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 156 days.

(21) Appl. No.: 15/497,455

(22) Filed: Apr. 26, 2017

(65) Prior Publication Data

US 2018/0314447 A1 Nov. 1, 2018

(51) Int. Cl.
*G06F 12/0813* (2016.01)
*G06F 13/38* (2006.01)
*G06F 12/1081* (2016.01)
*G06F 9/455* (2018.01)

(52) U.S. Cl.
CPC ........ *G06F 13/385* (2013.01); *G06F 12/1081* (2013.01); *G06F 9/45558* (2013.01); *G06F 2009/45583* (2013.01); *G06F 2212/656* (2013.01)

(58) Field of Classification Search
None
See application file for complete search history.

(56) References Cited

U.S. PATENT DOCUMENTS

| | | | |
|---|---|---|---|
| 7,213,081 B2 | 5/2007 | Narasimhamurthy et al. | |
| 7,917,726 B2 | 3/2011 | Hummel et al. | |
| 8,041,915 B1 | 10/2011 | Wahlig et al. | |
| 8,214,618 B2 | 7/2012 | Jeong | |
| 8,701,115 B2 | 4/2014 | Bhandari et al. | |
| 9,003,223 B2 | 4/2015 | Ackaret et al. | |
| 9,292,451 B2 | 3/2016 | Dong | |
| 9,311,240 B2 | 4/2016 | Dawkins et al. | |
| 2004/0030816 A1 | 2/2004 | Knight et al. | |
| 2009/0198832 A1* | 8/2009 | Shah | H04L 41/0668 709/239 |

(Continued)

OTHER PUBLICATIONS

List of IBM Patents or Patent Applications Treated as Related, May 2, 2017, 2 pages.

(Continued)

*Primary Examiner* — Hyun Nam
(74) *Attorney, Agent, or Firm* — Cantor Colburn LLP; William Kinnaman (57) ABSTRACT

An aspect includes memory access optimization for an I/O adapter in a processor complex. A memory block distance is determined between the I/O adapter and a memory block location in the processor complex and determining one or more memory movement type criteria between the I/O adapter and the memory block location based on the memory block distance. A memory movement operation type is selected based on a memory movement process parameter and the one or more memory movement type criteria. A memory movement process is initiated between the I/O adapter and the memory block location using the memory movement operation type.

18 Claims, 8 Drawing Sheets

(56) References Cited

U.S. PATENT DOCUMENTS

| | | | |
|---|---|---|---|
| 2010/0128606 A1* | 5/2010 | Patel | H04L 12/5691 |
| | | | 370/235 |
| 2011/0060880 A1* | 3/2011 | Hosoda | G06F 12/0811 |
| | | | 711/124 |
| 2012/0150805 A1 | 6/2012 | Pafumi et al. | |
| 2012/0216188 A1 | 8/2012 | Tsirkin | |
| 2015/0256484 A1* | 9/2015 | Cameron | G06F 9/3004 |
| | | | 709/226 |
| 2016/0342195 A1 | 11/2016 | Karamcheti et al. | |
| 2018/0314447 A1 | 11/2018 | Driever et al. | |
| 2018/0314455 A1* | 11/2018 | Driever | G06F 3/0647 |

OTHER PUBLICATIONS

U.S. Appl. No. 15/497,449, filed Apr. 26, 2017, Entitled: Memory Access of Optimization in a Processor Complex, First Named Inventor: Patricia G. Driever.
List of IBM Patents or Patent Applications Treated as Related; (Appendix P), Filed Oct. 8, 2019, 2 pages.
U.S. Appl. No. 16/569,016, filed Sep. 12, 2019, Entitled: Memory Access of Optimization in a Processor Complex, First Named Inventor: Patricia G. Driever.
U.S. Appl. No. 16/578,721, filed Sep. 23, 2019, Entitled: Memory Access of Optimization for an I/O Adapter in a Processor Complex, First Named Inventor: Patricia G. Driever.

* cited by examiner

MEMORY ACCESS OPTIMIZATION FOR AN I/O ADAPTER IN A PROCESSOR COMPLEX

BACKGROUND

The present invention generally relates to computer memory system access, and more specifically, to memory access optimization for an input/output (I/O) adapter in a processor complex.

A processor complex can be formed by physically integrating multiple platforms together in larger physical containers (e.g., blade, chassis and rack systems) as a single larger-scale platform. A processor complex can include tiers of both physical and virtual hosting with different physical distance attributes. Memory access within the processor complex and/or between the processor complex and one or more other computer systems can be performed through one or more I/O adapters.

SUMMARY

Embodiments of the present invention are directed to a computer-implemented method for memory access optimization for an I/O adapter in a processor complex. A non-limiting example of the computer-implemented method includes determining a memory block distance between the I/O adapter and a memory block location in the processor complex and determining one or more memory movement type criteria between the I/O adapter and the memory block location based on the memory block distance. A memory movement operation type is selected based on a memory movement process parameter and the one or more memory movement type criteria. A memory movement process is initiated between the I/O adapter and the memory block location using the memory movement operation type.

Embodiments of the present invention are directed to a system for memory access optimization for an I/O adapter in a processor complex. A non-limiting example of the system includes a plurality of logical partitions allocated between one or more processors of one or more processing nodes with a local memory system in one or more processor drawers of the processor complex and a plurality of I/O drawers, each of the I/O drawers includes one or more I/O cards, each of the I/O cards includes one or more instances of the I/O adapter. The processor complex is configured to determine a memory block distance between the I/O adapter and a memory block location in the local memory system and determine one or more memory movement type criteria between the I/O adapter and the memory block location based on the memory block distance. A memory movement operation type is selected based on a memory movement process parameter and the one or more memory movement type criteria. A memory movement process is initiated between the I/O adapter and the memory block location using the memory movement operation type.

Embodiments of the invention are directed to a computer program product for memory access optimization for an I/O adapter in a processor complex, the computer program product including a computer readable storage medium having program instructions embodied therewith. In a non-limiting example, the program instructions are executable by processing circuitry to cause the processing circuitry to perform determining a memory block distance between the I/O adapter and a memory block location in the processor complex and determining one or more memory movement type criteria between the I/O adapter and the memory block location based on the memory block distance. The program instructions are also executable to cause the processing circuitry to perform selecting a memory movement operation type based on a memory movement process parameter and the one or more memory movement type criteria and initiating a memory movement process between the I/O adapter and the memory block location using the memory movement operation type.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, various forms of hosting (virtualizing) multiple instances of operating systems within unique "containers" (i.e., logical partitions) on various physical compute platforms continue to evolve and grow, scaling out and up. This technology is typically referred to as "hypervisor" technology. Growth is occurring vertically (larger images) and horizontally (more images). There is also growth in the number of virtualization solutions provided by hardware, firmware and software products.

As the number of operating system instances that can be hosted on a single platform, such as a processor complex, continues to grow, new challenges are identified with scalability. Some of the scalability issues are related to density and many issues (e.g., bottlenecks) are related to the sheer number of virtual servers on a single physical platform all attempting to communicate with each other. The need to communicate among the various hosts is driven by forming clustered or multi-tiered solutions. This communication bottleneck has generated a need for advanced forms of highly optimized internal and external communications. Tiers of both physical and virtual hosting with different physical distance attributes in a processor complex can result in variable memory access delays and other challenges. Challenges of efficient memory access and transfer of data can also occur between multiple processor complexes, particularly where different delays and physical separation distances exist between local memory and input/output adapter pairs on each end of a remote data transfer.

Turning now to an overview of the aspects of the invention, one or more embodiments of the invention address the above-described shortcomings of the prior art by providing shared real memory across multiple hosts within or between processor complexes. Host software provides an input/output adapter with visibility to a physical memory topology of the processor complex to determine one or more memory system attributes, such as a distance between memory and a physical location of the input/output adapter, and can expose real-time feedback, such as memory access time and machine cycles to complete the memory access. Some memory access delays can be relatively consistent due to physical separation, memory block access size, and other constraints. Based on these physical memory attributes, a memory access "cost factor" can be calculated and used when accessing a memory block. Other memory access delays can change dynamically depending on resource allocation, contention and utilization. When it is predicted that particular types of direct memory access requests will likely result in extended delays or other degraded performance metrics, embodiments can mitigate the degradation by utilizing alternative memory access techniques, such as asynchronous operations, alternative instructions or offload memory block movement requests to an offload engine of an input/output adapter that can schedule memory movement between two or more locations in the processor complex. Memory block movement that is determined to be less burdensome, e.g., due to block size and/or average operation performance, can be initiated directly by a general-purpose direct memory access (DMA) controller once the destination and other memory credentials are known. The offload engine can be one or more special purpose DMA controllers that are dedicated to performing larger block transfers over extended periods of time.

The above-described aspects of the invention address the shortcomings of the prior art by including a query service that enables hosts (and operating system guests) to learn the location of processor(s) and physical memory of a host as well as the physical location of an input/output adapter used to transfer data into and out of the physical memory. Location information regarding a processor drawer/chip/node, an input/output drawer/card/adapter, and physical memory allocated to a host can be shared with input/output adapters to support distance determinations. A distance need not be known precisely; rather, a relative separation to support an offload minimum memory block size determination can be sufficient in making offload and/or direct synchronous/asynchronous memory movement decisions. Memory location information with respect to input/output adapter location information can be used for calculating the distance to a targeted memory location (e.g., relative to a memory block location and input/output adapter location). Memory access times, such as real-time machine instruction cycle count/operation feedback, can be made available to compare against one or more memory movement type criteria. The one or more memory movement type criteria can establish thresholds for taking mitigation actions. Mitigation actions can include determining whether to use general-purpose direct memory movement or offload memory movement and/or dynamically adjusting the thresholds to reduce the use of particular direct memory access controllers to balance resource utilization, for example. Technical effects and benefits include selecting a memory movement operation type within a processor complex or I/O adapter DMA processor that is likely to reduce the cost of memory access, enhance system responsiveness, and reduce overall latency.

Figure 1:
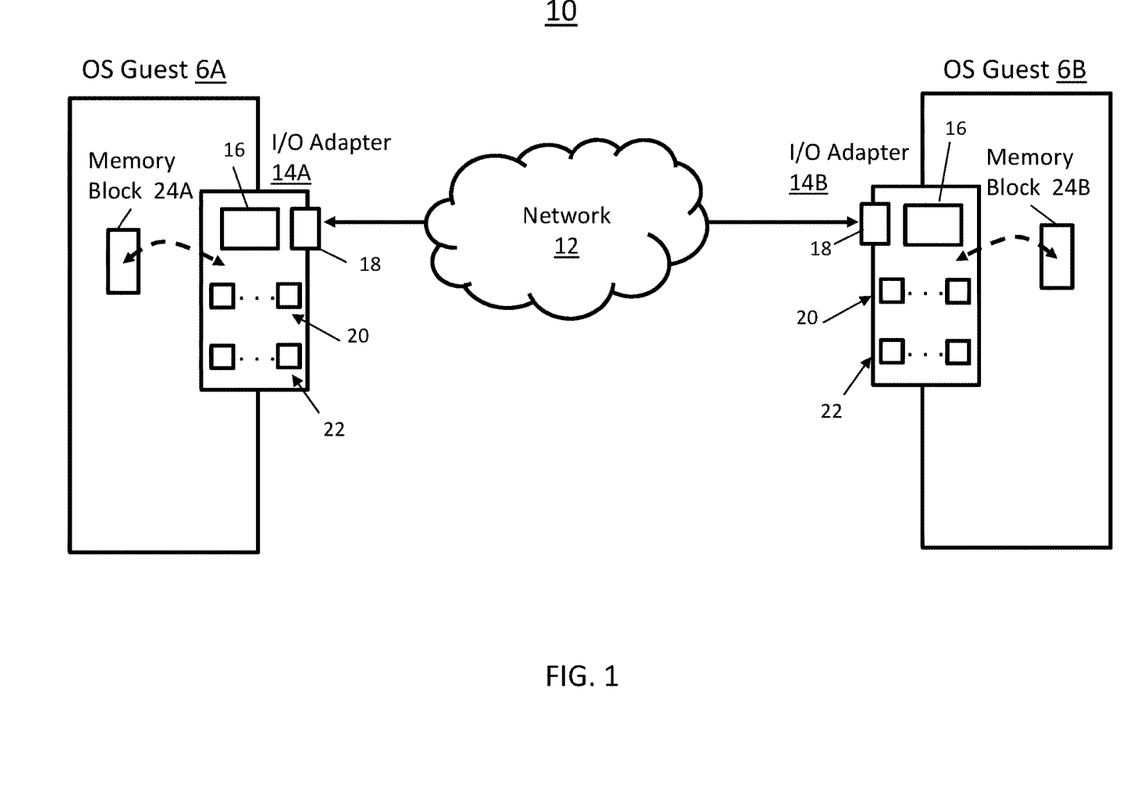
FIG. 1 depicts a system according to one or more embodiments.

Turning now to a more detailed description of aspects of the present invention, FIG. 1 depicts an example of a system 10 according to embodiments of the invention. The system 10 includes a first operating system (OS) guest 6A operable to initiate a memory access request to/from a second OS guest 6B across a network 12 through respective input/output (I/O) adapters 14A, 14B. Each of the I/O adapters 14A, 14B can include an adapter controller 16, a network interface 18, one or more general-purpose DMA controllers 20, and one or more offload engines 22. The one or more offload engines 22 can be configured as special-purpose DMA controllers (DMA engines) reserved for larger block transfers implemented over an extended period of time, while the general-purpose DMA controllers 20 (DMA engines) can be optimized for smaller data block transfer sizes, for instance, operable at higher throughput and shorter duration bursts of data. The general-purpose DMA controllers 20 can be configured to operate in a synchronous or an asynchronous mode of operation with respect to data transfers on a shared Peripheral Component Interconnect (PCI) bus or other communication bus, for example.

In embodiments, the I/O adapter 14A can read or store the contents of a memory block 24A of OS guest 6A. The adapter controller 16 of I/O adapter 14A can be implemented as processing circuitry operable to configure the network interface 18, the general-purpose DMA controllers 20, and the offload engines 22 depending on factors such as a block size of the memory block 24A, relative distance between the physical location of the memory block 24A and I/O adapter 14A, movement performance (e.g., as determined based on average move instruction cycle count), and communication protocol support through the network 12 to the I/O adapter 14B. Similarly, the I/O adapter 14B can read or store the contents of a memory block 24B of OS guest 6B using, for example, DMA read or DMA write operations. The adapter controller 16 of I/O adapter 14B can configure the network interface 18, the general-purpose DMA controllers 20, and the offload engines 22 depending on factors such as a block size of the memory block 24B, relative distance between the physical location of the memory block 24B and I/O adapter 14B, movement performance, and communication protocol support through the network 12 to the I/O adapter 14A. OS guests 6A and 6B can be allocated on different hosts within a same processor complex or in separate processor complexes. Accordingly, the communication protocols supported by network 12 can vary depending on the architectural details of the system 10.

The selection between using general-purpose DMA controllers 20 and the offload engines 22 can be made separately for each of the I/O adapters 14A, 14B. For example, if memory block 24A is determined to be in close physical proximity to the I/O adapter 14A, then I/O adapter 14A may set a threshold to select between using general-purpose DMA controllers 20 and the offload engines 22 to a larger memory block size value to favor using the general-purpose DMA controllers 20 even for larger block transfers between the memory block 24A and I/O adapter 14A. Independent of the selection by I/O adapter 14A, I/O adapter 14B can perform its own threshold determination based on the relative distance between I/O adapter 14B and the location of memory block 24B. Thus for a same sized transfer of data between memory block 24A and memory block 24B, the I/O adapter 14A can select the general-purpose DMA controllers 20 for transfers to/from memory block 24A while I/O adapter 14B may select the offload engines 22 in I/O adapter 14B to control transfers to/from memory block 24B (e.g., memory block distance between I/O adapter 14B and memory block 24B is greater than memory block distance between I/O adapter 14A and memory block 24A).

Figure 2:
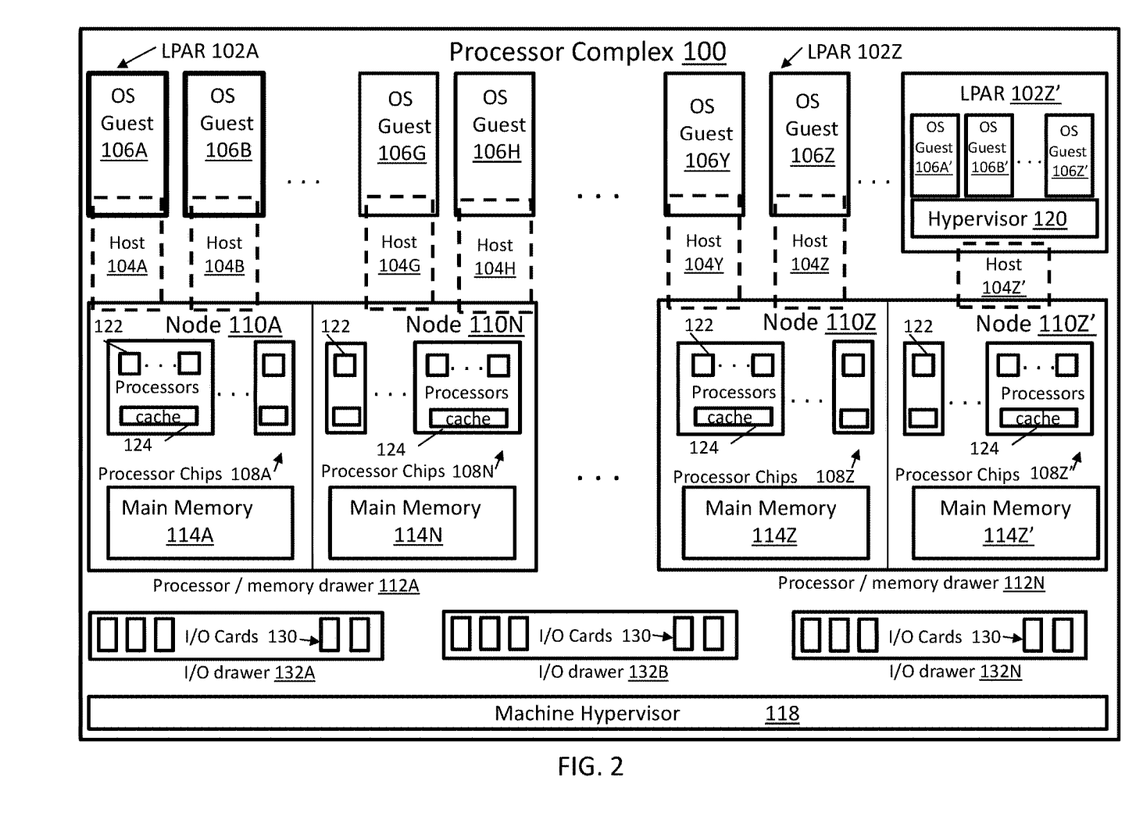
FIG. 2 depicts a processor complex according to one or more embodiments.

The example of FIG. 2 depicts a processor complex 100 according to embodiments of the invention. Multiple logical partitions (LPARs) 102A-102Z can be defined to allocate a plurality of processing and memory resources of hosts 104A-104Z to a plurality of OS guests 106A-106Z. Each of the hosts 104A-104Z may provision specific processing and memory resources to corresponding OS guests 106A-106Z, and the allocation of resources can change dynamically over a period of time. In the example of FIG. 1, host 104A and host 104B are allocated to processor chips 108A of a processing node 110A in a processor drawer 112A. Each of the hosts 104A and 104B may have specific portions of main memory 114A allocated for respective OS guests 106A and 106B with shared access to processor chips 108A and a system controller 116A. The processor drawer 112A is an example of a physical partition that can group multiple processing nodes 110A-110N in close physical proximity. OS guests 106G and 106H can access processing and memory resources of processing node 110N in processor drawer 112A through respective hosts 104G and 104H, which may include dedicated space in main memory 114N and shared access to processor chips 108N and system controller 116N.

Processor drawer 112N within processor complex 100 can share a same machine hypervisor 118 as other drawers, such as processor drawer 112A, to support shared access and resource allocation throughout the processor complex 100. Processor drawer 112N includes processing nodes 110Z and 110Z'. Host 104Y and host 104Z are allocated to processor chips 108Z of processing node 110Z in processor drawer 112N. Each of the hosts 104Y and 104Z may have specific portions of main memory 114Z allocated for respective OS guests 106Y and 106Z with shared access to processor chips 108Z and system controller 116Z. Host 104Z' can be allocated to processor chips 108Z' in processing node 110Z' in processor drawer 112N with main memory 114Z' and system controller 116Z'. Rather than a single OS guest, LPAR 102Z' can allocate a plurality of second-level guests that share access to host 104Z' through a hypervisor 120, including OS guest 106A' and 106B'-106Z'.

The processor chips 108A-108Z' can each include multiple processors 122 and cache 124. Although a specific configuration is depicted in FIG. 1, it will be understood that any number of drawers, nodes, processor chips, memory systems, hosts, and/or guests can be implemented in embodiments as described herein. Move operations may be performed using DMA operations managed, for example, by one or more I/O cards 130 in I/O drawers 132A, 132B, up to 132N. Each of the I/O cards 130 can include one or more I/O adapters 14 of FIG. 1. Certain I/O cards 130 and I/O drawers 132A-N may be physically closer to or further from a local memory system, such as main memory 114A-114Z', resulting in potential throughput variations for memory transfers to/from particular memory locations and I/O adapters 14. In conditions where direct memory movement by one or more general-purpose DMA controllers 20 of FIG. 1 is likely to be less efficient, one or more offload engines 22 of FIG. 1 can be used to schedule memory accesses/movement as further described herein.

The underlying machine hardware architecture can define a memory block distance in quantifiable units based on the specific physical machine topology, form factors and other hardware packaging considerations. The architecture that defines the units can be generalized and extendable to potential changes in future physical machine topologies. Memory block distance can be expressed as a relative distance between the physical location of a memory block of pinned physical memory (e.g., main memory 114A-Z') for a user instance (e.g., an OS guest 106A-Z') with respect to an I/O adapter 14 of an I/O card 130 within the infrastructure of the processor complex 100. The location of an OS guest 106A-Z' can be based on the location of the physical processor(s) 122 used by a particular OS guest 106A-Z', for instance, a processor drawer number. In some embodiments, the OS guest 106A-Z' can be viewed as a logical user of shared memory. For instance, an OS guest 106A-Z' can be considered a remote user of shared memory in the sense that a user is external to the instance of the OS guest 106A-Z' owning a host 104A-Z' of actual memory (i.e., the instance that owns and shares a block of main memory 114A-Z').

When memory is to be exposed (made accessible) to an I/O adapter 14 for sharing with a remote host 104A-Z' in processor complex 100 or another system, the memory physical location can be passed to the I/O adapter 14 (along with any existing memory credentials, such as a DMA address, key or token for direct shared access). A DMA address given to the I/O adapter 14 can be used to produce a key or token that is shared with another OS. The memory block distance attribute can be calculated as follows in the examples of FIGS. 2-5 and also described in reference to FIG. 1. Host 104A owns memory block 202 in main memory 114A. The term "owns" indicates that host 104A allocates, pins, manages and registers (e.g., assigns) the memory with input/output (IO) translation services (e.g., MMIO) of host 104A. Using a query service, host 104A can learn the physical location of memory block 202 (e.g., physical processor drawer 112A, processing node 110A, container, etc.). When host 104A is ready to expose (share) memory block 202 with a remote peer host (such as host 104Z), host 104A can pass credentials of memory block 202 to an I/O adapter 214, 314, 414 on one of the I/O cards 130. In addition to passing the memory credentials 204 for memory block 202 (e.g., a key, token, size, etc.), host 104A can also include a memory block distance between the memory block 202 and the I/O adapter 214, 314, 414. The memory block distance can be defined by the physical architecture and the signaling protocol of the processor complex 100. The I/O adapter 214, 314, 414 can save the location of memory block 202 along with the memory block distance that represents a memory access cost factor.

A host of the processor complex 100, such as host 104Z, or a remote processor complex (not depicted) can remotely access memory block 202 through adapter-to-adapter communication, where the same I/O adapter 214, 314, 414 is shared or through another I/O adapter (e.g., I/O adapter 14B of FIG. 1). To efficiently transfer data of the memory block 202 to the I/O adapter 214, 314, 414, host 104A can learn (e.g., query) its physical processor 122 (machine container) location (i.e., physical location of processor(s) 122 of host 104A) with the corresponding location of memory block 202 that appears in a local memory system (e.g., main memory 114A) of the host 104A. Host 104A also determines the physical location of the I/O adapter 214, 314, 414 accessible by the host 104A to perform adapter-based transfers with other hosts. Host 104A can compare the two locations between the memory block 202 and the I/O adapter 214, 314, 414, and may calculate and save the distance (difference in locations) expressed as an enumerated value (e.g., where "Near", "Intermediate", and "Far" are translated into three basic memory access cost factors). The difference represents the memory block distance. The definition of the memory block distance can be generally expressed as a common logical "distance" factor (metric) that can be further defined by the specific generation of machine architecture and the physical packaging. The values can continue to be used (extended) across subsequent generations of machines (i.e., accounting for evolutions of future machine physical packaging). In some embodiments, three enumerated options (e.g., Near, Intermediate, Far) provide sufficient granularity for memory operation determination. For example, the distance to memory values may be defined as:
a. Distance 1=Near; processor drawer 112 and I/O drawer 132 in close physical proximity (e.g., processor drawer 112A and I/O drawer 132A in FIG. 3 using I/O adapter 214 for accessing memory block 202). b. Distance 2=Intermediate; a greater physical separation between processor drawer 112 and I/O drawer 132 (e.g., processor drawer 112A and I/O drawer 132B in FIG. 4 using I/O adapter 314 for accessing memory block 202). c. Distance 3=Far; largest physical separation between processor drawer 112 and I/O drawer 132 (e.g., processor drawer 112A and I/O drawer 132N in FIG. 5 using I/O adapter 414 for accessing memory block 202).

Each memory block distance can also be augmented with a dynamic access time attribute that accounts for the current average access time (e.g., average move instruction cycle count) for a specific host 104A-Z' and/or I/O adapter 214, 314, 414 for real-time memory access. For instance, the augmented distance values can be expressed as Near 1 or Near 2 for Distance 1, Intermediate 1 or Intermediate 2 of Distance 2, and Far 1 or Far 2 for Distance 3. Near 1 is for a physically close alignment of a processor drawer 112 and I/O drawer 132 with an average access time <=X. Near 2 is for a physically close alignment of a processor drawer 112 and I/O drawer 132 with an average access time >X. Intermediate 1 is for a physically intermediate alignment of a processor drawer 112 and I/O drawer 132 with an average access time <=Y. Intermediate 2 is for a physically intermediate alignment of a processor drawer 112 and I/O drawer 132 with an average access time >Y. Far 1 is for a physically larger separation in alignment of a processor drawer 112 and I/O drawer 132 with an average access time <=Z. Far 2 is for a physically larger separation in alignment of a processor drawer 112 and I/O drawer 132 with an average access time >Z. Values of X, Y, and Z are examples of move instruction cycle count thresholds.

In embodiments, the processor complex 100 provides the capability to directly access sharable real memory and can provide a direct memory access capability with a synchronous move operation between adapters 214, 314, 414 and main memory 114. The synchronous move operation may be used for smaller move operations that can complete within a determined time/cost criteria. The synchronous move operation can be interruptible or non-interruptible through the one or more general-purpose DMA controllers 20 of FIG. 1. When a move size threshold is reached (based on a memory block size to move) then an asynchronous operation/process can be provided for much larger data move operations. In some cases, DMA technology of the I/O adapters 214, 314, 414 also provides a different type of DMA engine that can be used to "off-load" the cycles needed to perform a DMA operation, as embodied in one or more offload engines 22 of FIG. 1.

Real-time feedback (when requested) about the cost of the various move operations including, for example, synchronous interruptible operations and asynchronous interruptible operations can be provided to determine how long or how many cycles a DMA operation takes to complete. As part of instruction completion of synchronous interruptible operations, a total machine cycle count (cycles per instruction) to complete the execution of the synchronous operation can be provided as feedback of a DMA operation.

Asynchronous interruptible operations can be performed by one or more general-purpose DMA controllers 20 or one or more offload engines 22 of FIG. 1. Upon the completion of the final stage ("stage 2") of the asynchronous move operation, the total time to complete the move/store operation(s) can be provided and may be expressed as a cycle count. For asynchronous operations, attributes of total time and both intervals may be captured (returned and saved). Execution time can indicate the elapsed time required for the execution of an actual (large) move operation. Elapsed time for the asynchronous process to start (time from scheduled to dispatched) can also be tracked. Delays can indicate other resource constraint issues, cache or memory contention, memory nest bottlenecks or priority issues.

Figure 3:
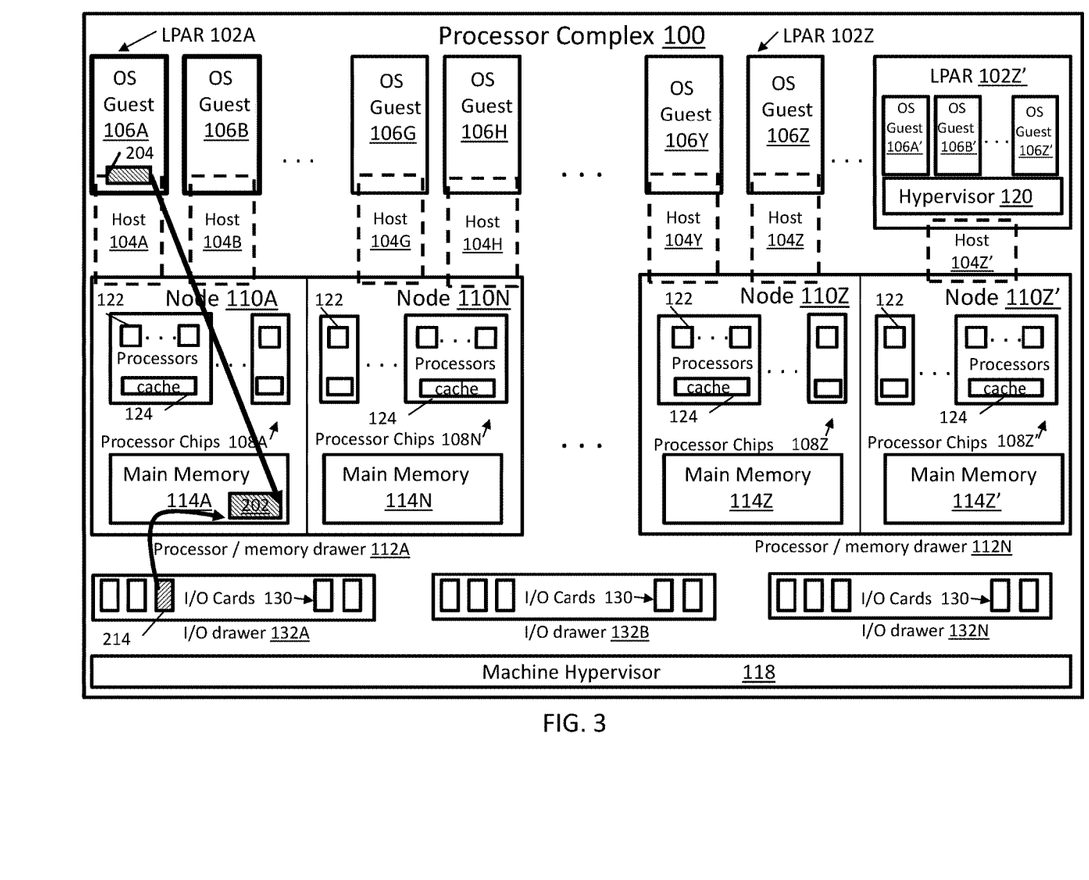
FIG. 3 depicts a near-distance memory access in a processor complex according to one or more embodiments.
Figure 4:
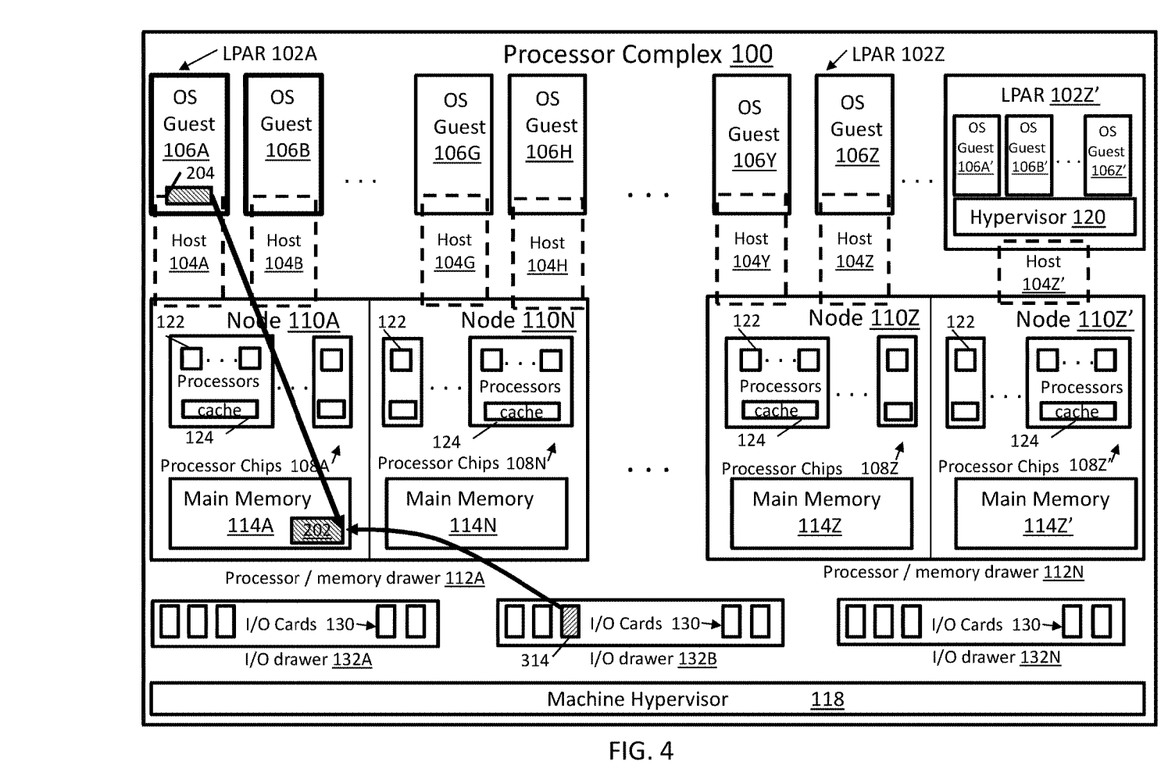
FIG. 4 depicts an intermediate-distance memory access in a processor complex according to one or more embodiments.
Figure 5:
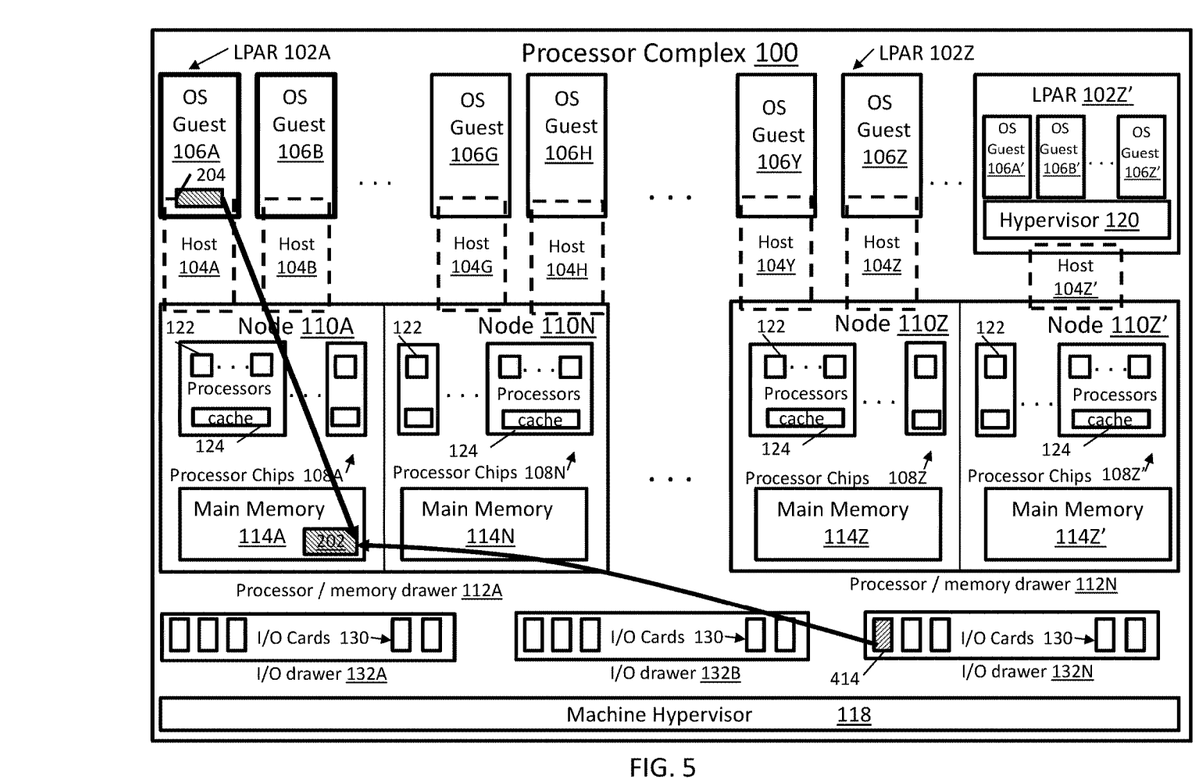
FIG. 5 depicts a far-distance memory access in a processor complex according to one or more embodiments.

Once static (distance) and real-time feedback (access time) information is defined and made available, I/O adapters 214, 314, 414 can use the information to establish threshold criteria and algorithms for choosing which method would optimize access to shared memory based on, move size, distance and average access time. The I/O adapters 214, 314, 414 may also track average memory access time and dynamically adjust the memory access methods to take actions to mitigate any potential negative impact. In some embodiments, the I/O adapters 214, 314, 414 can receive timing data from a DMA engine. In severe cases of congestion, direct memory access may be halted and other communication protocols can be used as a mitigation action. The most optimal move operation for accessing shared real memory can be based on several attributes. For example, the move operation type and parameters can be determined based on the length (size) of the data to be moved, the distance to memory, and/or the average access time to memory (for this size of data move operation). Thresholds can be established related to the cost of move operations based on the length (size) of the data to be moved. In some cases, the thresholds may be set by an administrator (e.g., external configuration settings or policy) based on workload priority that can influence the selected move method. Examples of data move thresholds include: Threshold A (T_A) <=1 k (move size is small); Threshold B (T_B) <=64 k (move size is intermediate, greater than 1 k but less than 64 k); and Threshold C (T_C) >64 k (most size is large).

When different types of move methods are supported (e.g., each having different cost implications) for accessing (moving into) shared real memory (such as memory block 202), then an example move selection can include determining when the move size is small (data move size <=T_A) and using the synchronous move operation. When the move size is intermediate (data move size <=T_B), the distance can be examined to select the synchronous move operation when the distance <=Near 1. An asynchronous move can be invoked when the distance <=Near 2. Otherwise, an asynchronous move can be scheduled on the one or more offload engines 22 (i.e., memory block distance is intermediate or far). When the move size is large (e.g., data move size >T_B), if the distance <=Intermediate 2, an asynchronous move process can be invoked on one or more general-purpose DMA controllers 20; otherwise, an asynchronous move can be scheduled on the one or more offload engines 22 (i.e., memory movement is large and far).

Embodiments can continuously and dynamically adjust the selected move method (i.e. various operations for direct memory access). The current feedback behavior and cost thresholds can be continuously monitored along with workload priority (policies) influencing the move operation select. As the cost of the synchronous move operation continues to climb, embodiments can reduce the threshold used to switch to asynchronous operations. For example, instead of switching at data move size X (128 k), the switch to an asynchronous move can be made at size Y (64 k)). Use of the one or more offload engines 22 vs. initiation or completion of the move operation on one or more general-purpose DMA controllers 20 can switch as the delay to schedule and dispatch on the one or more offload engines 22 changes with latency and cost increases.

Embodiments can determine when to switch to use other forms of communications and communications protocols (i.e., when direct memory access itself is becoming a bottleneck, constrained to the point it is now longer viable, then dynamically switch to other (standard) external network communication protocols). For example, embodiments can count/track the number of connections using memory at Far distances. For such connections, a total count of the number of Far connections experiencing an average access time >Far 2 can be tracked. When the total count reaches a threshold (e.g., number or percentage of Far connections executing at >Far 2) then use of shared memory can be modified (e.g., fallback to other communications) or creation of new connections at Far distances can be stopped/reduced. When the total count drops below a second threshold, then direct memory access can be re-enabled for Far connections. Statistical metrics can be provided that indicate why and when (e.g., frequency) direct memory access is no longer used for Far connections.

Figure 6:
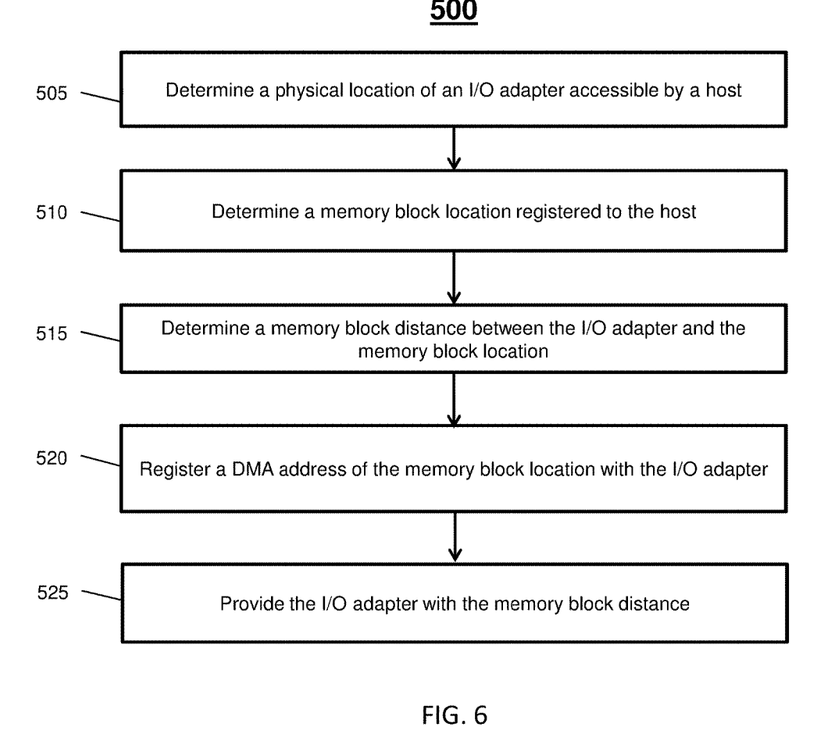
FIG. 6 depicts an example process flow for a memory block distance determination according to one or more embodiments.

FIG. 6 depicts a flow diagram of a process 500 for determining a processor to memory distance is generally shown in accordance with an embodiment. The process 500 is described with reference to FIGS. 1-5 and may include additional steps beyond those depicted in FIG. 6.

At block 505, a physical location of an I/O adapter 214, 314, 414 accessible by a host 104A is determined. At block 510, the memory block location of memory block 202 registered to the host 104A is determined. At block 515, a memory block distance between the I/O adapter 214, 314, 414 and the memory block location of memory block 202 is determined. At block 520, a DMA address of the memory block location of memory block 202 is registered with the I/O adapter 214, 314, 414. The memory block distance can be determined based on the memory block location of memory block 202 in relation to the physical location of the I/O adapter 214, 314, 414. The memory block distance can identify a relative physical proximity of the local memory system (e.g., main memory 114A) and one or more processors 122 assigned to the host 104A with respect to the physical location of the I/O adapter 214, 314, 414 accessible by the host 104A. At block 525, the memory block distance is provided to the I/O adapter 214, 314, 414.

Figure 7:
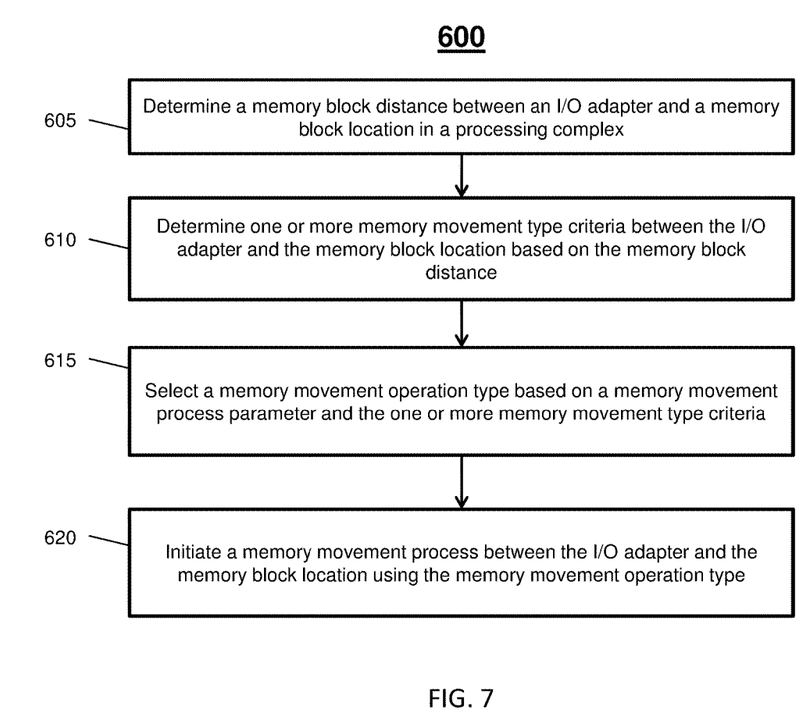
FIG. 7 depicts an example process flow for initiating a memory movement process according to one or more embodiments.

Turning now to FIG. 7, a flow diagram of a process 600 for memory access optimization in a processor complex, such as processor complex 100, is generally shown in accordance with an embodiment. The process 600 is described with reference to FIGS. 1-6 and may include additional steps beyond those depicted in FIG. 7.

At block 605, a memory block distance between an I/O adapter 214, 314, 414 and a memory block location of memory block 202 in the processor complex 100 is determined. At block 610, one or more memory movement type criteria between the I/O adapter 214, 314, 414 and the memory block location of memory block 202 can be determined based on the memory block distance. The one or more memory movement type criteria can be an offload minimum memory block size. The offload minimum memory block size can be determined based on the memory block distance. As another example, the one or more memory movement type criteria can be a move instruction cycle count threshold.

At block 615, a memory movement operation type is selected based on a memory movement process parameter and the one or more memory movement type criteria. The memory movement process parameter can be a block size of the memory block 202 at the memory block location. As another example, the memory movement process parameter can be an average move instruction cycle count.

At block 620, a memory movement process is initiated between the I/O adapter 214, 314, 414 and the memory block location of memory block 202 using the memory movement operation type. The memory movement process can be performed by an offload engine 22 of the I/O adapter 214, 314, 414 based on determining that the block size of the memory block 202 at the memory block location exceeds the offload minimum memory block size. The memory movement process can be performed by the I/O adapter 214, 314, 414 as an asynchronous move operation based on determining that the memory movement process parameter exceeds one or more intermediate criteria. The memory movement process can be performed by the I/O adapter 214, 314, 414 as a synchronous move operation based on determining that the memory movement process parameter does not exceed the one or more intermediate criteria. Data read at the memory block location from the I/O adapter 214, 314, 414 at a first host 104A can be sent to a second host 104B-Z'. Data received at the I/O adapter 214, 314, 414 from the second host 104B-Z' can be written to the memory block location of the first host 104A (e.g., as depicted between memory block 24A and 24B).

Figure 8:
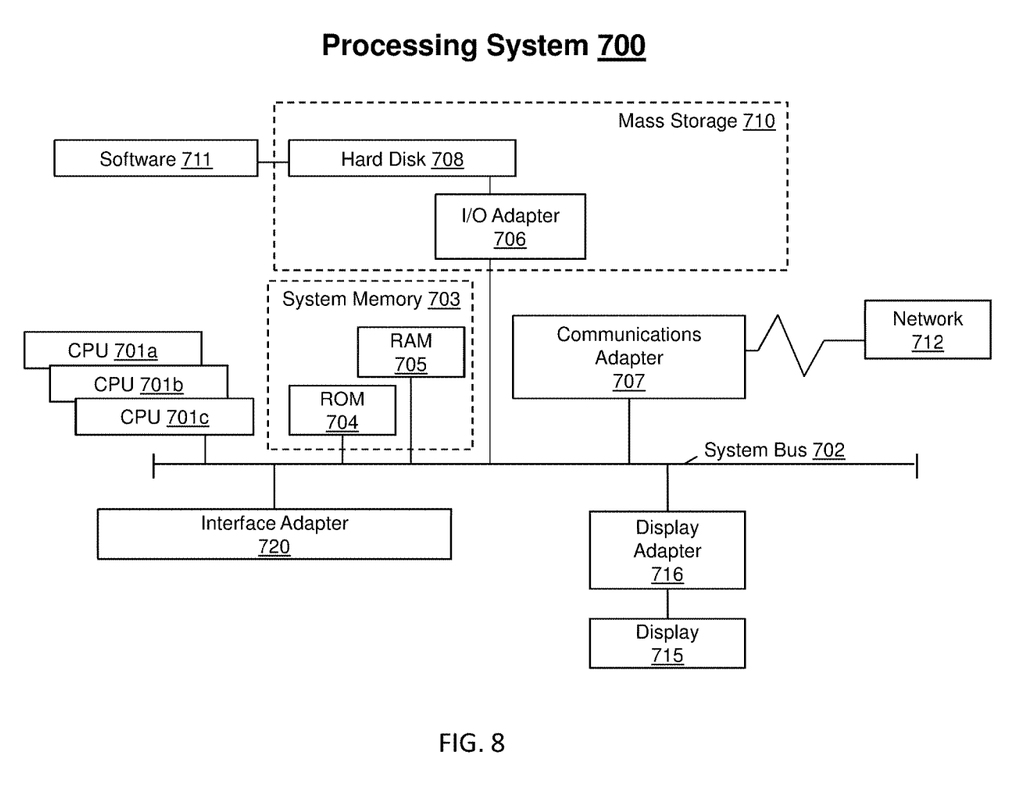
FIG. 8 depicts a processing system in accordance with one or more embodiments.

Referring now to FIG. 8, there is shown an embodiment of a processing system 700 for implementing the teachings herein. In this embodiment, the processing system 700 has one or more central processing units (processors) 701a, 701b, 701c, etc. (collectively or generically referred to as processor(s) 701) that can be an embodiment of the processor chips 108A-Z' or processor 122 of FIG. 2 and/or adapter controller 16 of FIG. 1. The processors 701, also referred to as processing circuits/circuitry, are coupled via a system bus 702 to a system memory 703 and various other components (such as system controllers 116A-Z' of FIG. 2). The system memory 703 can include read only memory (ROM) 704 and random access memory (RAM) 705. The ROM 704 is coupled to system bus 702 and may include a basic input/output system (BIOS), which controls certain basic functions of the processing system 700. RAM 705 is read-write memory coupled to system bus 702 for use by the processors 701.

FIG. 8 further depicts an input/output (I/O) adapter 706 and a communications adapter 707 coupled to the system bus 702. I/O adapter 706 may be a small computer system interface (SCSI) adapter that communicates with a hard disk 708 and/or any other similar component. I/O adapter 706 and hard disk 708 are collectively referred to herein as mass storage 710. Software 711 for execution on the processing system 700 may be stored in mass storage 710. The mass storage 710 is an example of a tangible storage medium readable by the processors 701, where the software 711 is stored as instructions for execution by the processors 701 to perform a method, such as the processes 500, 600 of FIGS. 6 and 7. Communications adapter 707 interconnects the system bus 702 with an outside network 712 enabling processing system 700 to communicate with other such systems. A display 715 is connected to system bus 702 via a display adapter 716, which may include a graphics controller to improve the performance of graphics intensive applications and a video controller. In one embodiment, adapters 706, 707, and 716 may be connected to one or more I/O buses that are connected to the system bus 702 via an intermediate bus bridge (not shown). Suitable I/O buses for connecting peripheral devices such as hard disk controllers, network adapters, and graphics adapters typically include common protocols, such as PCI. Additional input/output devices can be connected to the system bus 702 via an interface adapter 720 and the display adapter 716. A keyboard, mouse, speaker can be interconnected to the system bus 702 via the interface adapter 720, which may include, for example, a Super I/O chip integrating multiple device adapters into a single integrated circuit.

Thus, as configured in FIG. 8, the processing system 700 includes processing capability in the form of processors 701, and, storage capability including the system memory 703 and the mass storage 710, input means such as keyboard and mouse, and output capability including speaker and the display 715. In one embodiment, a portion of the system memory 703 and the mass storage 710 collectively store an operating system, such as the z/OS or AIX operating system from IBM Corporation, to coordinate the functions of the various components shown in FIG. 8.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for memory access optimization for an input/output (I/O) adapter in a processor complex, the computer-implemented method comprising:
   determining a physical location of the I/O adapter accessible by a host;
   determining a memory block location registered to the host;
   determining a memory block distance between the I/O adapter and the memory block location in the processor complex;
   determining one or more memory movement type criteria between the I/O adapter and the memory block location based on the memory block distance;
   selecting a memory movement operation type based on a memory movement process parameter and the one or more memory movement type criteria;
   providing the I/O adapter with an address of the memory block location and the memory block distance based on the memory block location in relation to the physical location of the I/O adapter; and
   initiating a memory movement process between the I/O adapter and the memory block location using the memory movement operation type.

2. The computer-implemented method of claim 1, wherein the processor complex comprises:
a plurality of processor drawers, each of the processor drawers comprising one or more processing nodes, each of the processing nodes comprising a local memory system and one or more processors;
a plurality of I/O drawers, each of the I/O drawers comprising one or more I/O cards, each of the I/O cards comprising one or more instances of the I/O adapter; and
wherein the memory block distance identifies a relative physical proximity of the local memory system and one or more processors assigned to the host with respect to the physical location of the I/O adapter accessible by the host.

3. The computer-implemented method of claim 1, wherein the one or more memory movement type criteria comprise an offload minimum memory block size, the memory movement process parameter comprises a block size of memory at the memory block location, and further comprising:
determining the offload minimum memory block size based on the memory block distance; and
performing the memory movement process by an offload engine of the I/O adapter based on determining that the block size of memory at the memory block location exceeds the offload minimum memory block size.

4. The computer-implemented method of claim 1, wherein the one or more memory movement type criteria comprise a move instruction cycle count threshold, and the memory movement process parameter comprises an average move instruction cycle count.

5. The computer-implemented method of claim 1, wherein the memory movement process is performed by the I/O adapter as an asynchronous move operation based on determining that the memory movement process parameter exceeds one or more intermediate criteria, and the memory movement process is performed by the I/O adapter as a synchronous move operation based on determining that the memory movement process parameter does not exceed the one or more intermediate criteria.

6. The computer-implemented method of claim 1, further comprising:
sending data read at the memory block location from the I/O adapter at a first host to a second host; and
writing data received at the I/O adapter from the second host to the memory block location of the first host.

7. A system for memory access optimization for an input/output (I/O) adapter in a processor complex, the system comprising:
a plurality of logical partitions allocated between one or more processors of one or more processing nodes with a local memory system in one or more processor drawers of the processor complex;
a plurality of I/O drawers, each of the I/O drawers comprising one or more I/O cards, each of the I/O cards comprising one or more instances of the I/O adapter, wherein the processor complex is configured to:
determine a physical location of the I/O adapter accessible by a host;
determine a memory block location registered to the host;
determine a memory block distance between the I/O adapter and the memory block location in the local memory system;
determine one or more memory movement type criteria between the I/O adapter and the memory block location based on the memory block distance;
select a memory movement operation type based on a memory movement process parameter and the one or more memory movement type criteria;
provide the I/O adapter with an address of the memory block location and the memory block distance based on the memory block location in relation to the physical location of the I/O adapter; and
initiate a memory movement process between the I/O adapter and the memory block location using the memory movement operation type.

8. The system of claim 7, wherein
the memory block distance identifies a relative physical proximity of the local memory system and one or more processors assigned to the host with respect to the physical location of the I/O adapter accessible by the host.

9. The system of claim 7, wherein the one or more memory movement type criteria comprise an offload minimum memory block size, the memory movement process parameter comprises a block size of memory at the memory block location, and the processor complex is further configured to:
determine the offload minimum memory block size based on the memory block distance; and
perform the memory movement process by an offload engine of the I/O adapter based on determining that the block size of memory at the memory block location exceeds the offload minimum memory block size.

10. The system of claim 7, wherein the one or more memory movement type criteria comprise a move instruction cycle count threshold, and the memory movement process parameter comprises an average move instruction cycle count.

11. The system of claim 7, wherein the I/O adapter is operable to perform the memory movement process as an asynchronous move operation based on determining that the memory movement process parameter exceeds one or more intermediate criteria, and the I/O adapter is operable to perform the memory movement process as a synchronous move operation based on determining that the memory movement process parameter does not exceed the one or more intermediate criteria.

12. The system of claim 7, wherein the processor complex is further configured to:
send data read at the memory block location from the I/O adapter at a first host allocated at one of the logical partitions to a second host; and
write data received at the I/O adapter from the second host to the memory block location of the first host.

13. A computer program product for memory access optimization for an input/output (I/O) adapter in a processor complex, the computer program product comprising a non-transitory computer readable storage medium having program instructions embodied therewith, the program instructions executable by processing circuitry to cause the processing circuitry to perform:
determining a physical location of the I/O adapter accessible by a host;
determining a memory block location registered to the host;
determining a memory block distance between the I/O adapter and the memory block location in the processor complex;

determining one or more memory movement type criteria between the I/O adapter and the memory block location based on the memory block distance;

selecting a memory movement operation type based on a memory movement process parameter and the one or more memory movement type criteria;

providing the I/O adapter with an address of the memory block location and the memory block distance based on the memory block location in relation to the physical location of the I/O adapter; and initiating a memory movement process between the I/O adapter and the memory block location using the memory movement operation type.

14. The computer program product of claim 13, wherein the processor complex comprises:

a plurality of processor drawers, each of the processor drawers comprising one or more processing nodes, each of the processing nodes comprising a local memory system and one or more processors;

a plurality of I/O drawers, each of the I/O drawers comprising one or more I/O cards, each of the I/O cards comprising one or more instances of the I/O adapter; and wherein the memory block distance identifies a relative physical proximity of the local memory system and one or more processors assigned to the host with respect to the physical location of the I/O adapter accessible by the host.

15. The computer program product of claim 13, wherein the one or more memory movement type criteria comprise an offload minimum memory block size, the memory movement process parameter comprises a block size of memory at the memory block location, and the program instructions executable by processing circuitry further cause the processing circuitry to perform:

determining the offload minimum memory block size based on the memory block distance; and performing the memory movement process by an offload engine of the I/O adapter based on determining that the block size of memory at the memory block location exceeds the offload minimum memory block size.

16. The computer program product of claim 13, wherein the one or more memory movement type criteria comprise a move instruction cycle count threshold, and the memory movement process parameter comprises an average move instruction cycle count.

17. The computer program product of claim 13, wherein the memory movement process is performed by the I/O adapter as an asynchronous move operation based on determining that the memory movement process parameter exceeds one or more intermediate criteria, and the memory movement process is performed by the I/O adapter as a synchronous move operation based on determining that the memory movement process parameter does not exceed the one or more intermediate criteria.

18. The computer program product of claim 13, wherein the program instructions executable by processing circuitry further cause the processing circuitry to perform:

sending data read at the memory block location from the I/O adapter at a first host to a second host; and writing data received at the I/O adapter from the second host to the memory block location of the first host.

* * * * *